United States Patent [19]

Duksa

[11] Patent Number: 4,656,967
[45] Date of Patent: Apr. 14, 1987

[54] DOG WALKING DEVICE

[76] Inventor: Richard Duksa, 1063 West St., Southington, Conn. 06489

[21] Appl. No.: 766,952

[22] Filed: Aug. 19, 1985

[51] Int. Cl.⁴ .............................................. A01K 15/00
[52] U.S. Cl. ........................................ 119/29; 119/120
[58] Field of Search ................... 119/29, 153, 120, 121

[56] References Cited

U.S. PATENT DOCUMENTS

| | | | |
|---|---|---|---|
| 2,921,572 | 1/1960 | Miller et al. | 119/153 X |
| 3,965,866 | 6/1976 | Lorentz et al. | 119/29 |
| 4,232,630 | 11/1980 | Orlowski et al. | 119/29 |
| 4,286,788 | 9/1981 | Simington et al. | 119/29 |

Primary Examiner—Hugh R. Chamblee
Attorney, Agent, or Firm—Chilton, Alix & Van Kirk

[57] ABSTRACT

A dog walking device employs an endless belt which is suspended between two pulleys and is connected to a slider element for driving a tether assembly. The slider element slides along a cable which is positioned generally parallel to the endless belt and is elevated above the path which is traversed by the dog. The endless belt is formed from a continuous filament braided material forming a hollow portion which interiorly receives one section of the material so that one end of the section extends through the side of the hollow enclosure for adjustably varying the length of the endless belt.

12 Claims, 5 Drawing Figures

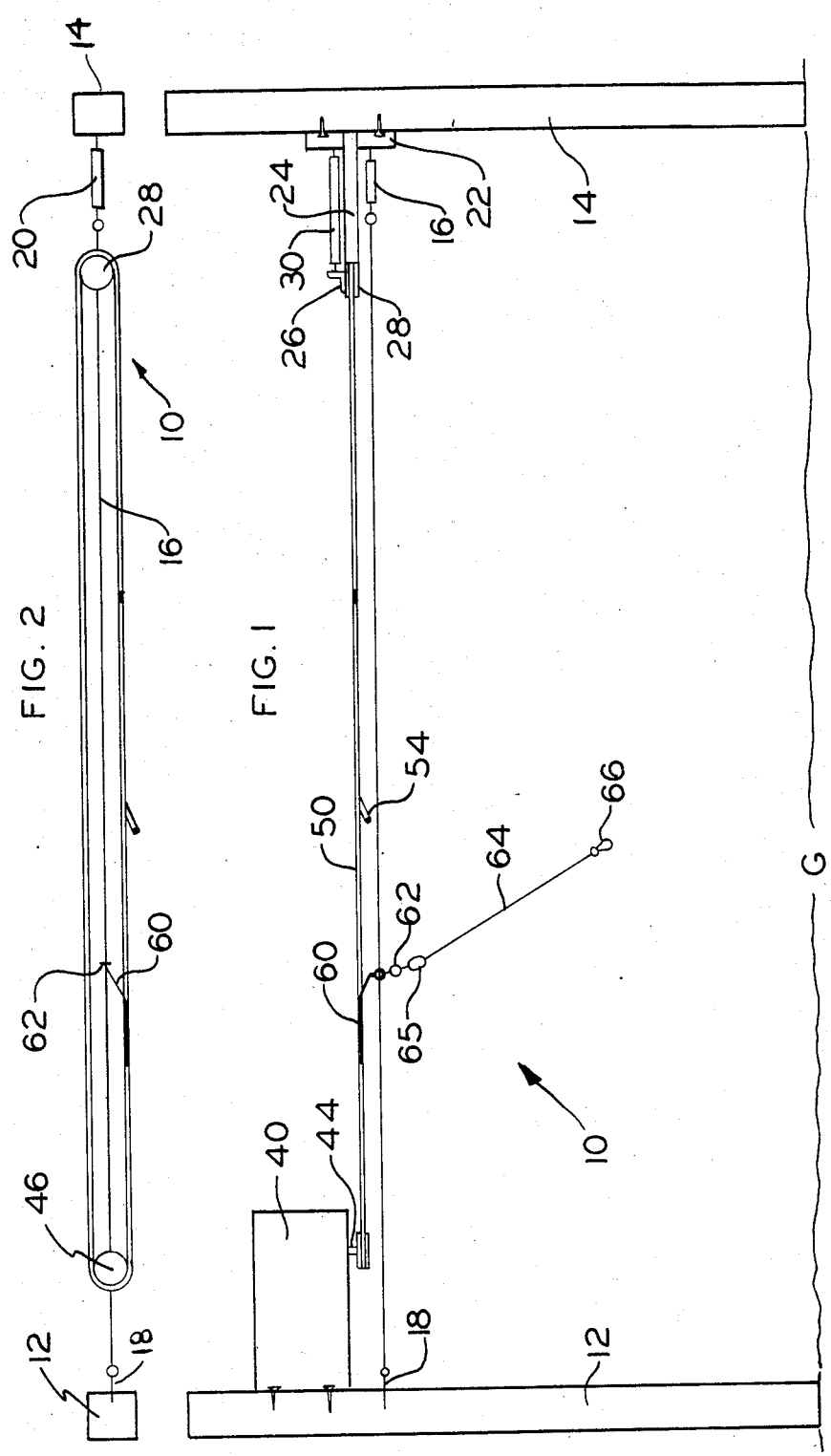

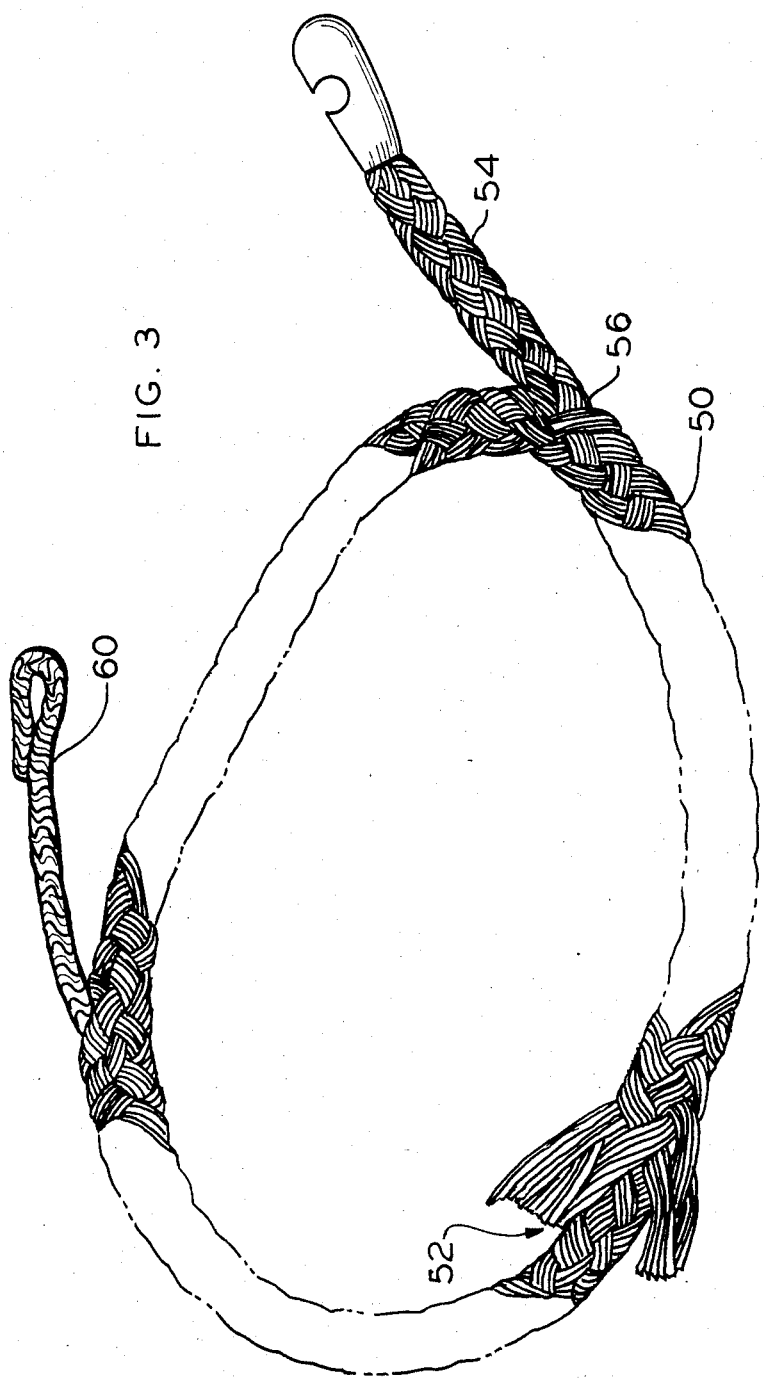

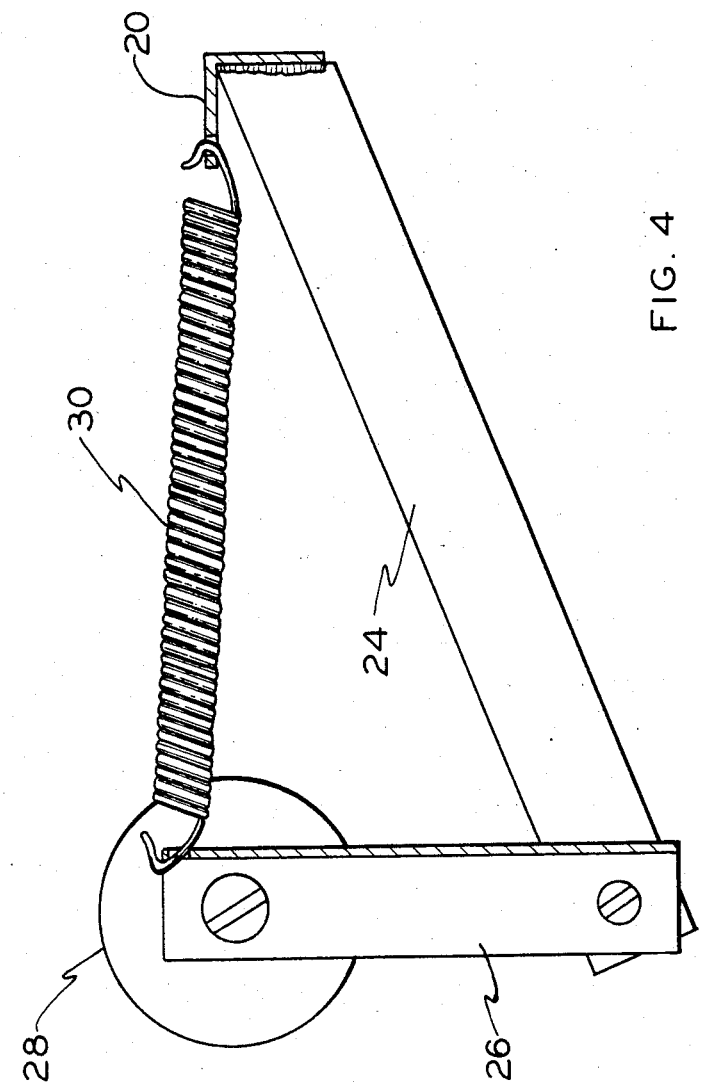

DOG WALKING DEVICE

BACKGROUND OF THE INVENTION (1) Technical Field of the Invention

This invention relates generally to devices employed for automatically walking or exercising an animal. More particularly, this invention relates to devices employing a tether assembly for restraining a dog to a path of travel defined by a suspended elevated cable.

(2) Prior Art

A number of devices have been proposed for exercising animals and particularly for automatically exercising dogs. U.S. Pat. Nos. 4,232,630 issued to Orlowski et al., 4,286,788 issued to Simington et al., 2,871,915 issued to Hogan, and 3,965,866 issued to Lorentz et al. generally disclose devices which employ a motor operated assembly for reciprocating a tethered object along a path.

U.S. Pat. No. 4,232,630 discloses an animal exerciser having a carriage which attaches to an animal and an endless belt which moves the carriage in a substantially straight line, the direction of travel of the carriage being reversed at each end of the line of travel.

U.S. Pat. No. 3,965,866 discloses an animal exerciser adapted to be mounted overhead within a support structure spanning a ground area. The exerciser of U.S. Pat. No. 3,965,866 includes a drive sheave and a plurality of idler sheaves suspended to receive an endless elongated belt. A tether assembly is connected to the belt and includes a drum and a retractable cord adapted to be connected to an animal leash or halter so that when the device is driven by a motor to move the belt in a continuous cycle, the animal is led about a circuit defined by the drive and idler sheaves.

U.S. Pat. No. 3,678,903 discloses an animal or a leash guide assembly for confining the movement of a tethered animal to a limited area. The guide assembly employs a plurality of stationery retaining blocks to provide a mount for an endless cable. A traveler member is slidably secured along the cable at one end and secured to the animal at another end. The traveler member forms a slot so that the traveler member passes through the retaining blocks and traverses a path for restraining the movement of the associated animal to a limited area.

BRIEF SUMMARY OF THE INVENTION

Briefly stated, the invention in a preferred form is an animal walking device having a cable or the like which provides an overhead linear guideway. A slider is mounted on the cable for sliding linear motion along the cable. An endless belt is suspended between an idler pulley and a drive pulley to provide a belt drive which is parallel to the guideway. A connector cord connects the endless belt with the slider to pull the slider along the guideway. A leash assembly extends from the slider and is adapted for leashing a dog or other animal so that upon continuous unidirectional driving of the belt, the animal is led back and forth along a path which is generally defined by the guideway. The idler pulley is biased by a spring to provide tension to the endless belt. The slider preferably comprises a ring member which is adapted to slide along the cable. The endless belt is formed from a rope which is at least partly hollow. The connector cord is received in the hollow portion of the rope, i.e., the end of the connector cord extends through an enclosing side of the belt defining rope. The length of the endless belt may be varied to facilitate the proper tensioning of the belt. The rope which defines the belt is preferably formed from a braided continuous filament polyester material.

BRIEF DESCRIPTION OF THE DRAWING

FIG. 1 is a side elevational view, partly broken away, of a dog walking device in accordance with the present invention;

FIG. 2 is a top plan view, partly broken away, of the dog walking device of FIG. 1;

FIG. 3 is an enlarged fragmentary top perspective view of an endless belt employed in the dog walking device of FIG. 1;

FIG. 4 is an enlarged fragmentary top plan view of the dog walking device of FIG. 1.

DETAILED DESCRIPTION OF THE INVENTION

Figure 5:
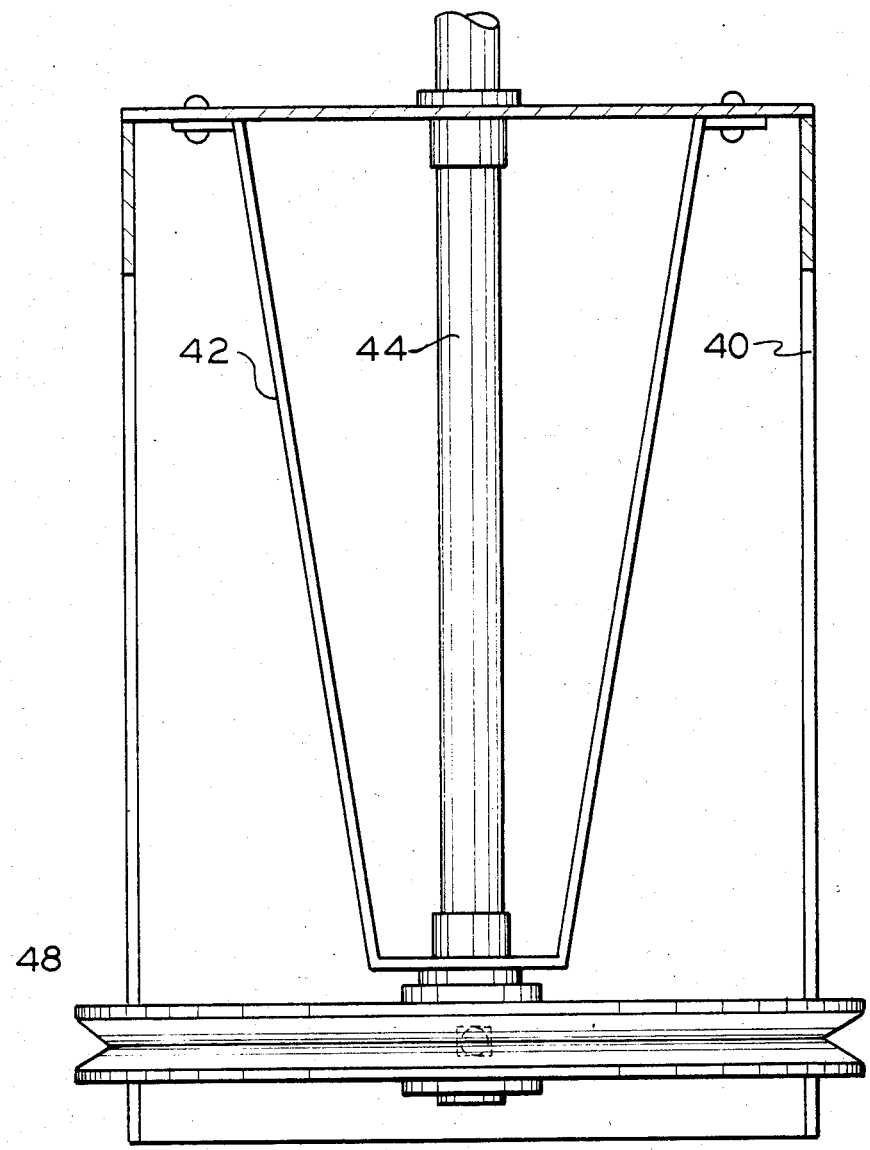
FIG. 5 is an enlarged fragmentary central end view of the dog walking device of FIG. 1.

With reference to the drawing, wherein like numerals represent like parts throughout the FIGURES, a dog walking device in accordance with the present invention is generally designated by the numeral 10. Dog walking device 10 functions in a manner wherein a dog or other animal may be leashed to the device and the device operated to thereby lead the dog in continuous back and forth fashion (generally to the left and right of FIG. 1). The leashed dog traverses a general path across the ground G from left to right and right to left in continuing sequential fashion.

A pair of upstanding support posts 12 and 14 are mounted in the ground in a generally parallel vertical relationship to provide a sturdy support structure for the dog walking device. A plastic covered steel cable 16 is anchored at one end by an eyebolt 18 secured in support post 12. The other end of cable 16 is fastened to a turn buckle 18 which is anchored in a support bracket 20 secured to support post 14. Cable 16 is tightened by turn buckle 20 to a taut configuration so that cable 16 generally extends between the support posts in an elevated orientation substantially parallel to the ground G which constitutes the general area for the travel path of the dog.

With additional reference to FIG. 4, bracket 20 is connected to an obliquely extending brace 24. The end of brace 24 is bolted to a support member 26 so that there is a limited degree of pivotal play between brace 24 and member 26. Support member 26 mounts a 3½ inch pulley 28 which rotates about a generally vertical axis. A coil spring 30 couples bracket 22 to support member 26 to exert tension relative to member 26 to pulley 28 as will be further described below. The bracket 20, brace 24 and support member 26 may be formed from 1½ inch by 1½ angle iron or other rugged materials.

A sturdy support housing 40 is mounted to support post 12 at a location vertically spaced from cable 16 and generally transversely symmetric thereto. A support frame 42 is secured to the support housing 40 as illustrated in FIG. 5 for securing a drive shaft 44 in generally vertical orientation. A driver pulley 46 is mounted below the support housing on the lower end of the drive shaft 44. The upper end of drive shaft 44 receives a drive wheel 48 which may be rotatably coupled to a motor (not illustrated) which provides the power for driving driver pulley 46.

With additional reference to FIG. 3, an endless belt 50 is suspended between driver pulley 46 and idle pulley 28 in a taut configuration to provide a belt drive between the pulleys. Endless belt 50 is comprised of a braided hollow rope which forms, at one end, an opening 52 for receiving the opposite end portion 54 of the braided rope. The end portion 54 is fed into the inerior of the rope and led outwardly through the wall of the hollow rope to thereby form the endless belt. In a taut configuration of the rope, the threads which define the rope tighten against rop portion 54 at point 56 where end 54 protrudes through the wall frictionally secure the end 54 in a fixed position. The length of the endless belt may be adjusted by relieving tension and adjusting (increasing or decreasing) the length of the exposed or protruding portion of end 54. The endless belt is placed under a suitable tension by mounting the belt between pulleys 28 and 46 and pulling the end 54 through the wall, to thereby decrease the effective length of the endless belt, and also by the force of tension spring 30. In preferred form, the endless belt is formed from continuous filaments of "Dacron" material such as "DuPont" Type No. 707. In one reduction to practice the material was braided into an eight-carrier weave with two piks per inch and a weight of 28 lbs. per 1,000 feet.

The first end of a connector cord 60, which is also preferably a braided cord material, also extends through the wall of the hollow braided rope which forms the endless belt and is thus secured at a fixed position to the endless belt. Connector cord 60, at the second end thereof loops to connect with a slide member 62. Slide member 62 may comprise a ring mounted on cable 16 so that slide member 62 may slide freely along cable 16. A tether line 64 is also connected via a universal swivel connector 65 to slide member 62. Tether line 64 extends generally downwardly to provide a connecting element for leashing a dog. It should be appreciated that the length of tether line 64 should be sufficient so that a dog standing on the ground below the device 10 may be leashed to the end of the member. In preferred form a second universal swivel element 66 is provided at the free end of the tether line 64. By providing a universal swivel connection between the tether line 64 and slide member 62 and a second universal swivel connection at the end of the line for connection to the dog collar, the leashed dog will be free to turn in any direction relative to the ground.

In operation, a dog is leashed to the end of the tether line 64 in a conventional manner. A rotational drive applied to drive shaft 44 drives the endless belt 50. The endless belt 50 to coupled via connector cord 60 to slide member 62 to pull the slide member along cable 16 (from right to left as illustrated in the configuration of FIG. 1). As the connector cord 60 passes over the driver pulley 46 the direction of travel of the endless belt relative to cable 16 is reversed, thus reversing the drive pull applied to slide member 62 so that the direction of travel of the slide member is reversed (from left to right as illustrated in FIG. 1). The foregoing reverse drive applied to slide member 62 is again reversed when the connector cord traverses around idler pulley 28. It can thus be seen that as the endless belt is continuous unidirectionally driven, the slide member is sequentially moved back and forth across the cable thus providing an efficient means whereby the leashed dog below the device may be efficiently led or walked back and forth along a path below the foregoing cable. The length of the tether cord may be dimensioned so that the path traversed by the leashed dog may be within selected limits.

A particular feature and advantage of the foregoing invention is the provision of the adjustable endless belt which may be selectively dimensioned for incorporation into a pulley system as described herein having a wide variety of spacial dimensions. The dog walking device 10 as described provides a very efficient means for leading the dog back and forth across a rather extended area on the ground in a fashion wherein the binding of the restraining lines is substantially eliminated and the potential for the dog engaging or becoming wrapped in the restraining lines is minimized.

While a preferred embodiment of the foregoing invention has been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A dog walking device comprising:
    cable means comprising a cable suspended between spaced supports for forming an elevated linear guideway;
    slide means mounted on said cable for sliding motion along said guideway;
    belt means comprising a pair of spaced pulleys and an endless belt, said belt passing about and extending between said pulleys whereby said belt may be continuously driven, said belt being formed from a flexible material and having an adjustable length, said belt means including means for supporting said pulleys such that said belt extends generally along and in spaced relation to said cable;
    connector means comprising a flexible connector continuously connected between a fixed location of said belt and said slide means to pull said slide means along said guideway so that when said belt is continuously driven in a first direction, the slide means sequentially travels in forward and reverse directions along the guideway; and tether means coupled to said slide means and adapted to be coupled to a lead for a dog.

2. The dog walking device of claim 1 wherein said guideway and said belt are disposed in generally parallel elevated relationship.

3. The dog walking device of claim 1 wherein said slide means comprises a ring adapted to slide along the cable.

4. The dog walking device of claim 1 wherein said belt means comprises an idler pulley and a driver pulley and further comprising means to drive said driver pulley.

5. The dog walking device of claim 4 further comprising biasing means acting on said idler pulley to exert tension on said belt.

6. The dog walking device of claim 1 wherein said endless belt is formed from an elongated hollow rope with an end section of said rope projecting through a side thereof with the end section of said rope being displaceable to vary the length of said endless belt.

7. The dog walking device of claim 6 wherein said connector further comprises a second rope extending through a side of said first rope.

8. The dog walking device of claim 6 wherein said rope is formed from a braided continuous filament polyester material.

9. The dog walking machine of claim 8 wherein when said rope is in a taut configuration, said end section is engaged by enclosing hollow rope portions to securably fix the effective length of said endless belt.

10. An animal exercising device comprising:
cable means comprising a cable suspended between spaced supports for forming an elongated elevated guideway;
slide means mounted on said cable for sliding motion along said guideway;
belt means comprising a pair of spaced pulleys and an elongated endless belt suspended between said pulleys for continuous motion thereabout, said endless belt being formed of a braided material which defines a hollow portion which interiorly receives one section of the braided material so that an end portion of said one section extends through an opening in said hollow portion and is displaceable relative to said opening for adjustably changing the length of said endless belt;
a connector extending between a fixed location of said belt and said slide means to pull said slide means along said guideway; and
tether means coupled to said slide means and adapted to be coupled to a lead for an animal so that an animal restrained by the lead is led back and forth along a path below the guideway upon the continuous driving of said endless belt in a first direction of rotation of said pulleys.

11. The animal exercising device of claim 10 wherein said connector extends through a second opening in the hollow portion of said endless belt and is interiorly secured therein.

12. The animal exercising device of claim 10 wherein when the endless belt is in a taut configuration, the portion of said material adjacent said opening engages said section to releasably securably fix the effective length of said endless belt.

* * * * *